United States Patent [19]

Venkataswamy et al.

[11] Patent Number: 4,978,643

[45] Date of Patent: Dec. 18, 1990

[54] FORMING WHISKER REINFORCED SINTERED CERAMICS WITH POLYMERIZABLE BINDER PRECURSORS

[75] Inventors: Krishna Venkataswamy, Framingham; Richard Waack, Wayland; Bruce E. Novich, Lexington; John W. Halloran, Hopkinton, all of Mass.

[73] Assignee: Ceramics Process Systems Corporation, Milford, Mass.

[21] Appl. No.: 249,210

[22] Filed: Sep. 23, 1988

Related U.S. Application Data

[63] Continuation of Ser. No. 54,628, May 27, 1987, abandoned, which is a continuation-in-part of Ser. No. 34,099, Apr. 1, 1987, abandoned, which is a continuation-in-part of Ser. No. 36,377, Apr. 9, 1987, Pat. No. 4,882,304.

[51] Int. Cl.$^5$ .............................................. C01B 31/00
[52] U.S. Cl. ........................................ 501/94; 501/95; 264/63; 264/29.1; 264/56; 264/302; 264/328.18
[58] Field of Search .................... 264/63, 29.1, 56, 65, 264/302, 328.18; 501/94, 95

[56] References Cited

U.S. PATENT DOCUMENTS

| | | | |
|---|---|---|---|
| 3,780,156 | 12/1973 | Cameron | 264/300 |
| 3,962,162 | 6/1976 | Schmank | 501/153 |
| 3,962,389 | 6/1976 | Takase et al. | 264/63 |
| 3,998,909 | 12/1976 | Roberts et al. | 260/862 |
| 4,011,195 | 3/1977 | Self | 260/40 R |
| 4,221,697 | 9/1980 | Osborn et al. | 260/42.53 |
| 4,265,794 | 5/1981 | Pett et al. | 264/63 |
| 4,388,255 | 6/1983 | Simpson | 264/332 |
| 4,409,344 | 10/1983 | Moulson et al. | 523/512 |
| 4,487,863 | 12/1984 | Goan | 523/512 |
| 4,543,345 | 9/1985 | Wei | 264/65 |
| 4,575,473 | 3/1986 | Domeier | 428/290 |
| 4,587,068 | 5/1986 | Borase et al. | 264/63 |
| 4,636,480 | 1/1987 | Hillig | 501/88 |
| 4,640,905 | 2/1987 | Burn | 501/136 |
| 4,810,442 | 3/1989 | Hillig et al. | 264/86 |
| 4,816,182 | 3/1989 | Novich et al. | 501/94 |

OTHER PUBLICATIONS

T. Dabak and O. Yucel, "shear Viscosity Behavior . . . ", Rheologica Acta, 25:527–533 (1986).
Temple C. Patton, *Paint Flow and Pigment Dispersion*, (New York: John Wiley & Sons, 1979), pp. 355–375.
*Ceramic Processing Before Firing*, Ed. by Onoda, Jr., and Hench (New York: John Wiley & Sons, 1978), pp. 211–225.

*Primary Examiner*—Olik Chaudhuri
*Assistant Examiner*—Andrew Griffin

[57] ABSTRACT

A solution containing polymerizable monomers and volatile solvents can be used to disperse ceramic particles along with ceramic whiskers and remain pourable even with high solids. Using this dispersion, a high solids ceramic article can be molded, polymerized in situ and fired with a good binder burnout.

8 Claims, No Drawings

FORMING WHISKER REINFORCED SINTERED CERAMICS WITH POLYMERIZABLE BINDER PRECURSORS

This application is a continuation of application Ser. No. 07/054,628, filed 27 May 1987, which is a continuation-in-part of co-pending U.S. application Ser. Nos. 034,099 filed Apr. 1, 1987 now abandoned and 036,377 filed Apr. 9, 1987 now U.S. Pat. No. 4,882,304, which are hereby incorporated herein by reference.

DESCRIPTION

This invention relates to novel processes for preparing ceramic compounds and to novel precursor composition in these processes. Specifically, this invention relates to a new in situ polymerization process and to the new binder compounds utilized with high concentrations of ceramic powder and whiskers.

BACKGROUND ART

In the manufacture of ceramic articles, it is common to employ a variety of polymers to act as binders to impart strength to the unfired "green" ceramic article. This is often accomplished by blending the ceramic powder with a binder solution containing polymers or by directly compounding the ceramic powder with molten polymers. The former method is generally used for tap casting, slip casting, and extrusion techniques whereas the latter is typically used in molding articles.

Both method suffer from a number of problems however. First, the extremely high viscosity of the polymeric solution restricts the concentration of ceramic powder which can be conveniently handled. This is particularly serious with sub-micron sized ceramic powders, especially those having a narrow particle size distribution. Secondly, when using the binder solution technique, the ceramic article has to be dried. Thirdly, it is difficult to completely remove the binder of either technique in the "binder burnout" stage prior to high temperature sintering.

The recent U.S. Pat. No. 4,587,068, issued for an invention of Borase et al. teaches a tape casting technique wherein the ceramic powder is mixed with a solution of monomers having a low vapor pressure. No solvents are present in the mixture. The tape is cast, then the monomer is polymerized. While there are some advantages to this method, the viscosity of the solventless fluid limits the applicability of the technique to tape casting or other molding methods involving a non-pourable paste. Further, due to the relatively high percentage of polymer in the article, a clean binder burnout may be difficult to achieve, particularly where the surface to volume ratio of the article is relatively small. Indeed, this patent itself notes that "some deformation of the ceramic material occurs during sintering." While Borase et al. do describe some relatively low viscosity slips at high solids loadings, e.g., 1180 cPs for 53.8 vol. % solids and 3500 cPs for 56.4 vol. % solids (although no shear rate is given; see discussion below), these are achieved only by extended milling times, respectively, of 90 hours (3.75 days) and 168 hours (7 days).

U.S. Pat. No. 3,962,162, issued for an invention of Schmank, discloses green refractory compositions including refractory powder, 1–30% unsaturated polyester, ½–12% unsaturated vinyl monomer, 0.2–0.5% catalyst for vinyl polymerization, 0.5–5% internal mold release compounds, and 0.5–7% volatile mold release and lubricant. The volatile mold release compounds described include butyl stearate, and other oily materials that volatilize without changing from about 120° to 200° C., including methyl stearate and dioctylphthalate. The mold release compound is then said to "be expelled" from solution during polymerization and appears to provide a reticulation of capillaries during volatilization so that subsequent firing can proceed without danger of rupture of the green ceramic during decomposition of polymerized binder."

These green composition prior to polymerization are variously described as "a fairly stiff plastic mass," "a very plastic dough," "a plastic dough," and "a stiff dough." These composition are also described as processed by extrusion at 300–700 psi through a die at elevated temperatures (130°–140° C.). Accordingly, these are not suitable for molding techniques requiring pourable slurries.

The addition of high aspect ratio particles (e.g., whiskers, fibers, platelets) to a material is one method of imparting greater fracture toughness, stiffness, and tensile strength to ceramic products. Whiskers are monocrystalline materials with diameters that are typically less than 1 micrometer and lengths ranging from approximately 10–80 micrometers. Whiskers have been made from a number of materials including silicon carbide, silicon nitride, and aluminum oxide. Fibers are polycrystalline, generally 10–15 microns in diameter, and may range up to several centimeters long; they are typically composed of materials such as silicon carbide, graphite, borosilicate, boron nitride, aluminum oxide, and aluminum silicate. In order to impart optimum properties, the whiskers should be uniformly dispersed throughout the suspension. Due to particle-to-particle interactions, this has been difficult to achieve. Such interactions include both agglomerative effects (e.g., Van der Waals forces) and repulsive forces (e.g., electrostatic repulsion).

Particle surface area is also an important criteria. Large surface area associated with fine particles usually requires a lower concentration of dispersed phase. High surface area materials, in addition to fine, submicron particles, are typically high aspect ratio particles such as whiskers, fibers, and platelets, but can also include porous particles. Additions of even small quantities (e.g., 5% by volume) of such materials have a dramatic effect on the rheology of the system; in essence, the effective volume of the high surface area particles (i.e., the volume of any associated double layer and that subjected to steric and electrostatic neutralization necessary for dispersion) can be significantly greater than the actual particle volume. Unfortunately, whiskers and fibers are very useful for improving physical properties of ceramics, such as fracture toughness and strength; and such properties are best enhanced when the whiskers or fibers are uniformly dispersed in the ceramic matrix. Further, the higher the total solids loading (i.e., sinterable and non-sintered material, such as alumina and silicon carbide whiskers), the better the particle packing in the green state by which drying and associated problems are avoided, and hence a denser sintered article can eventually be obtained.

Not only are surface effects an obstacle to providing a homogeneous slurry (the precursor to a matrix having uniformly dispersed reinforcing particles), but chemically diverse particles are difficult to disperse. For example, it is difficult to mix partially stabilized colloidal zirconia with colloidal alumina in aqueous suspension.

In conventional aqueous colloidal dispersions, the alumina particles (matrix phase) have a negative surface charge. When the partially stabilized zirconia (dopant), which as a positive surface charge, is added, the mixture hetero-coagulates. (The dopant is the material(s) in minor proportion to the matrix or main phase material; for whiskers and similar particles the dopant is typically unsintered in the final article, although some reaction may occur.) The use of dispersants helps, but is restricted due to the different surface chemistries of the colloidal phases. The coagulation imposes a rheological limit for the amount of dopant and matrix solids that can be added. Further, due to poor mixing, the resultant mixture is not homogeneous.

DISCLOSURE OF THE INVENTION

The present invention overcomes problems of the prior art by providing a monomeric solution which also contains particular dispersants, solvents, and whiskers. The solution is capable of dispersing a large volume of ceramic powder and uniformly dispersing whiskers while still retaining a low viscosity. The dispersion can then be poured, pumped, or injected at low to moderate pressure (e.g., $\leq 100$ psi) into a desired mold and then the monomers are polymerized in situ. The result is a rigid green body having a high solids content, high strength and requiring no drying prior to binder burnout and firing. The make up of the original binder is such that during the firing step binder burnout is substantially complete.

The solution described herein also has utility in tape casting techniques, more thoroughly described in co-pending application Ser. No. 034,035, filed Apr. 1, 1987, hereby incorporated herein by reference. Nevertheless, the present invention is particularly directed to forming complex shapes typical of those where whiskers and the like are conventionally added to improve structural properties; additionally, the present composition allows for the production of shapes at much lower costs than conventional HIP'ing or hot pressing since virtually no machining is required and because near net shape pressureless sintering is used. This invention also allows for the production of complex shapes that would be prohibitively expensive to produce by conventional HIP'ing or hot pressing because the forming process is similar to injection molding, and thus intricate geometries which could not be effectively machined from a HIP'ed or hot pressed billet are readily formed.

DESCRIPTION OF SPECIFIC EMBODIMENTS

In one preferred embodiment, the ceramic material is alumina, silicon nitride, SiAlON, or other powder such as zirconium oxide, silicon carbide, tungsten carbide, beryllia, boron nitride, boron carbide, aluminum nitride, and so forth, and mixtures thereof, preferably having a mean particle size in the range of approximately 0.3–3.5 micrometers, and which may have a narrow size range, i.e. a standard deviation not exceeding 50% of the mean. Alternatively, the powder may have conventional size ranges. Sub-micrometer size powders are also quite useful. The powders can be obtained by a variety of techniques, including precipitation and/or spray drying, or grinding or by utilizing a centrifugation classification system more fully described in applicants' co-pending application Ser. No. 028,891, filed Mar. 23, 1987, which is hereby incorporated herein by reference. This invention is also applicable to metal powders and to metal-ceramic composites; that is, it is broadly applicable to sinterable particles. Exemplary metal powders include iron and stainless steel, nickel, copper, gold, silver, and so forth, and mixtures and alloys thereof.

The powders are typically used at a high concentration, up to and including approximately 80–95 wt %. The useful weight percent varies with the density of the powder since maximum concentration of solids loading in a pourable slurry is primarily a function of volume of the particles being dispersed, not the weight fraction, as described more fully in co-pending U.S. patent application Ser. No. 07/045,684, filed 01 May 1987, incorporated herein by reference. See, e.g., G. W. Phelps and M. G. McLaren, "Particle-Size Distribution and Slip Properties," *Ceramics Processing Before Firing*, Ed. by Onoda and Hench (New York: John Wiley & Sons, 1978); briefly, as discussed therein and as generally known in rheology, small changes in the volume fraction of solids can have dramatic effects upon slip rheology. For the present invention, preferably volume fractions of solids include at least 45% by volume, more preferably at least 50% by volume. The effective maximum volume of solids (total of matrix, such as alumina, and dopant, such as whisker) can be about 65%, depending upon the composition of both the solids and the liquid, before which flow will not occur except under high pressure and/or at high shear rates; also, as discussed below, the effective volume of high aspect ratio particles is greater than for more spherical particles, so the presence of whiskers at 10% by volume on a theoretical basis (i.e., density fraction) can be equivalent to an effective volume of 20% in a highly loaded slurry due to particle interactions. See also Dabak and Yucel, "Shear viscosity behavior of highly concentrated suspensions at low and high shear-rates," *Rheologica Acta*, 25:527–533 (1986), who describe the maximum packing concentration of a suspension, its effect on viscosity, how it varies with the composition of the solid and liquid phase; the referenced works describe that the viscosity of monodispersed systems (narrow size distribution) all tend to approach infinity asymptotically at a maximum packing concentration of 0.605.

High aspect ratio particles have a higher effective volume than more spherical particles. All particles have a "zone of influence" from which they effect the fluid medium and other particles, often called a diffuse double layer or the Debye double layer; the "thickness" of the double layer for particles depends primarily on the particle's charge or valence, and thus for a given particle composition is essentially constant. Accordingly, for smaller particles (e.g., colloidal particles, generally $\leq 20$ $\mu$m, typically submicron, in all cases governed by surface forces) the double layer has a greater effect on increasing the particle's influence on the environment than for larger particles, so that the effective volume of a colloidal particle can be 10–25% larger than the actual volume, while for a larger particle this difference may be only 1–5%. High aspect ratio particles, because of their charge and geometry (colloidal diameter, possibly non-colloidal length; always high aspect and thus more difficult to close pack when randomly oriented), thus exclude a higher volume than their density would imply.

Another important rheological consideration is that chemically as well as geometrically diverse particles can increase resistance to flow by repulsive and/or agglomerative forces. Particles may agglomerate due to the attraction of opposite charges and/or by Van der Waals forces, and agglomerates may further attract each other, thereby exacerbating the viscosity increase. Particles may increase viscosity due to electrostatic/charge repulsion and/or by geometric volume exclusion, the latter being especially important when the high aspect ratio particles are randomly oriented, which is the most desireable configuration for reinforcing engineering materials. Dispersants can be used to decrease both the double layer (whether attractive or repulsive) and Van der Waals forces, but care must be taken because a balance is required between the attractive and repulsive forces to achieve a low viscosity; for example, adding a dispersant to decrease a repulsive electrical double layer (the dispersant adsorbs onto the particle surface and "attracts" the double layer, thereby decreasing its thickness) may only allow the Van der Waals forces to dominate, yet in both cases the system viscosity may be unchanged, and thus it may appear as if the addition of the dispersant had no effect. In practice, the art typically determines a suitable type and quantity of a dispersant by empirical methods. Particle surface area is also an important criteria. Large surface area associated with fine particles usually requires a lower concentration of dispersed phase. But it is a feature of this process that it can accommodate high surface area materials while maintaining fluidity at high solids.

The dispersant solution contains monomers, dispersant and a solvent, each component described in more detail below. The dispersant solution typically is approximately 15% by weight of the entire slurry, when the powder density is approximately 3-4 grams/cc.

The monomers used in the dispersant solution can be any vinyl or acrylic monomer or mixtures thereof, or they may also include oligomers with vinyl or acrylic functionalities. They may also be multi-functional or can contain other reactive structure types such as hydroxyl, epoxy, or urethane precursor structures. In preferred embodiments, the monomer may be chosen from acrylic acid and derivatives and esters thereof (such as methacrylic acid and ethylmethacrylate, respectively) and from other vinylic compounds, such as styrenes, vinyl pyridines, other vinyl compounds, or a mixture of these or their derivatives. After polymerization these yield poly-methacrylates, polyacrylates, polystyrenes, poly(vinyl pyridines), polyvinyls, or a mixture of these polymers or copolymers or their derivatives.

The monomers may make up about half of the dispersant solution, or about 7%-10% by weight of the entire slurry, but higher or lower levels of monomers may be useful depending on the shape of the piece being formed.

The remaining portion of the dispersant solution (or about 7%-10% by weight) is made up of various volatile organic molecules. This additional component of the dispersant solution may contain plasticizers, diluents, and dispersants. Typical plasticizers are dibutylphthalate and other phthalate esters. Examples of diluents include decalin and volatile fatty acids or esters, such as oleic acid or methyl/oleate. Exemplary dispersants include GAFAC RE-610 (an anionic polyoxyethylene nonylphenyl ether phosphate, available from the GAF Corp., Wayne, N.J.), AEROSOL OT (a dioctyl ester of sodium sulfosuccininc acid, available from American Cyanamid, Danbury, Conn.), organic titanates such as KR TTS or KR-7 (isopropyl, triisostearoyl titanate and isopropyl, dimethacryl, isostearoyl titanate, both available from Kenrich Petrochemicals, Inc., Bayonne, N.J.), or acrylic acid-based polymeric polyelectrolytes such as EMCOL CC-55 (a cationic polypropoxy quaternary ammonium acetate, available from Witco Chemical Co., Perth Amboy, N.J.), NARLEX LD-42 and NARLEX LD-45 (respectively, sodium and ammonium acrylate copolymers, available from National Starch and Chem. Corp., Bridgewater, N.J.), and DARVAN C (a polyelectrolyte of the ammonium salt type, available from R. T. Vanderbilt Co., Inc., Norwalk, Conn.) Dispersants are important for a number of reasons. First, they allow the very high solids dispersion to retain a low viscosity. Further, we have found that the suspension with the additional organic components exhibits better isotropic properties, which result in better isotropic properties in the formed piece, both in its green state and after firing. The particles seem to have a more random orientation resulting in less internal stress, and ultimately fewer defects.

The addition of whiskers, fibers, and/or platelets (high aspect ratio particles) to the slurry is achieved by the process set forth in the above-referenced application Ser. No. 07/036,377. Whiskers may be virtually any commercially available whisker, including those made from silicon carbide, silicon nitride, and aluminum oxide. The whiskers can be mixed into the highly loaded monomer solution described above. A preferred concentration will vary with the intended use, but can range from 1% by volume up to 40% by volume, although 5%-30% by volume is preferred as suitable for most uses. As described in that application, whiskers can be provided in desired sizes by centrifugal classification, as described in the aforementioned application Ser. No. 07/028,891, incorporated herein by reference. Thereafter, the matrix material, diluent, and dispersant (and for the present invention, the monomers) are mixed under high energy to provide a pourable slurry. The whiskers are then added while mixing is continued; preferably, the whiskers are added in aliquots and the composition is mixed between additions (a staged order of addition). A typical high energy mixer is a Red Devil brand dual paint shaker, or a high amplitude vibratory mill available from Sweco Co., Inc., Florence, Ky.

An important feature of this invention is that despite the highly loaded solids, the slurry is pourable. Typically, the viscosity ranged from 50 to 50,000 cPs with 50 to 5,000 cPs at 100 s$^{-1}$ being preferred (as measured on a Haake viscometer). However, it is to be understood that the preferred viscosity will depend on the fabrication equipment and the shape of the piece being formed. It is of primary importance that the slurry can flow readily without the need to use high pressure (such as that described by Schmank) to induce flow or to overcome a yield stress to flow; that is, the slurry is pourable (flows in a constant stream under gravity head) or injectable at low pressure (generally $\leq$100 psi); generally less than 10,000 cPs at 100 s$^{-1}$ is a low viscosity for composite systems including diverse particles, including chemically and/or geometrically diverse. Also, for ease of processing, the entire slurry is preferably pseudoplastic (shear thinning), and preferably it also exhibits dilatant characteristics, by which the homogeneity of the system is maintained in the absence of mixing or flow. It is also important to specify at what shear rate viscosity measurements are taken: at low shear rates (typically less than 1 s$^{-1}$) the viscosity approaches the yield value, and at high shear rates (usually greater than 1000 s$^{-1}$) the viscosity approaches the viscosity at infinite shear (see Patton, Temple C., *Paint Flow and Pigment Disper-* sion, 2nd Ed. (New York: John Wiley & Sons, 1979), especially chapter 16); see also Dabak and Yucel (discussed above) as they describe that viscosity at low shear rates is dominated by interparticle forces, viscosity at high shear rates is predominantly Newtonian where the interparticle effects are dominated by hydrodynamic forces, and in the intermediate shear rate region flow is pseudoplastic and the viscosity is a complex function of both solid and liquid properties.

In accordance with a preferred embodiment of the present invention, the solvent is substantially retained in the slurry until after polymerization of the monomer has been substantially completed. The solvent is thereafter substantially removed from the formed article by time of the early portion of the binder burnout stage. We have found that use of a solvent in this manner significantly enhances binder burnout and tends to reduce problems encountered such as cracking and warping of the material being fired. One way of achieving this result is to employ a volatile organic solvent having a boiling point that is higher than the temperature used to effect polymerization but lower than the temperature at which the polymer burns out. However, in some cases it may be desirable to employ a solvent having a boiling point below the polymerization temperature and to suppress volatilization of the solvent during polymerization by an alternative method, such as keeping the formed article under pressure during polymerization. For example, cyclohexane or other volatile, high vapor pressure solvents having a vapor pressure equal to or in excess of the ambient pressure; that is, at 85° C. (see Example 1 below) the vapor pressure of cyclohexane is about 763 torr, essentially ambient, while those of methyl methacrylate and ethyl acrylate are 460 torr and 496 torr, respectively, high enough to readily evaporate but not above the ambient pressure. In such a situation, the solvent truly would vaporize or boil unless that effect is suppressed. When this approach is followed, however, care must be taken with respect to the effect of the solvent vapor pressure in whatever environment the formed article is placed following polymerization; a sudden decrease in pressure and a release of a large amount of solvent as vapor could cause cracking or deformation of the formed article.

In another embodiment, the in situ polymerization occurs without the need for elevating the temperature above room temperature (approximately 20°–35°) although the reaction may occur at elevated temperatures. In this embodiment, two slurries are mixed. Both slurries contain ceramic particles, monomers, solvents and dispersants as described above. In addition one slurry contains a catalyzable initiator such as benzoyl peroxide and the second contains a compound which catalyzes the initiator. Examples of such compounds can be found in U.S. Pat. Nos. 3,991,008 and 3,591,438. Preferred compounds of this type include dimethyl aniline, dimethyl toluidine, and thioureas. As the two slurries are mixed, the reaction of the catalyst with the peroxide triggers in situ polymerization. Alternatively, the catalyst may, of course, be added directly to a slurry containing the initiator.

The following examples are presented to illustrate the invention.

EXAMPLE 1

The following components were milled together:

AKP 20 Alumina 55.75 g ($d_{avg}$=0.4–0.6 μm, 4–6 m$^2$/g) (Sumitomo Chemical America Corp., New York, N.Y.)

| | |
|---|---|
| yttria | 6.20 |
| Monomers | 8.5 |
| dibutylphthalate | 4.5 |
| decalin | 2.5 |
| Gafac RE-610 | 1.5 |

All component amounts, as listed above, are expressed in weight as grams throughout the examples. Monomers were 90/5/5 n-butyl methacrylate/methacrylic acid/diethylene glycol dimethacrylate. To this was added 21.05 g silicon carbide whiskers (AK SiC-3 or AK SiC from Tatcho distributed by ICP Group, New York, N.Y.). An initiator, benzoyl peroxide, was then added at 0.45 g per 100 g slip. The desired shape was formed in an injection mold (rotor or widget) under low pressure, as viscosity is low. The shape was heated to approximately 85° C., whereupon the monomers polymerized, yielding a solidified shape which was near net shape. The pieces were fired at 1720° C. for 2 hours. Volume amounts were calculated from the weights using the following densities: alumina=3.98 g/ml; yttria=5.01 g/ml; silicon carbide=3.2 g/ml; and 0.90 g/ml as an average for the organics (estimated based on ddecalin≈0.85 g/ml, dDBP≈1.04 g/ml, dGAFAC RE-610 ≈1.04 g/ml, dstearic acid≈0.94 g/ml, and dmethyl methacrylate≈0.93 g/ml). Accordingly, approximate volume amounts for this example were 14.01 ml for the alumina, 1.24 ml for the yttria, 18.89 ml for the organics, and 6.58 ml for the whiskers; this results in a total solids volume of 53.6%, 16.2% being contributed by the whiskers. Yttria was added as a sintering aid.

EXAMPLE 2

The same general procedure as detailed in Example 1 was followed, except the monomers used were 90/5/5 2-ethylhexylacrylate/methacrylic acid/diethylene glycol dimethacrylate.

EXAMPLE 3

The same general procedure was followed as detailed in Example 1, except the following components were used:

| AKP 20 Alumina 65.54 g | |
|---|---|
| yttria | 7.28 |
| SiC whiskers | 10.18 |
| monomers | 8.50 |
| DBP | 4.50 |
| Decalin | 2.50 |
| RE-610 | 1.50 |

Monomers were 90/5/5 n-butylmethacrylate/methacrylic acid/diethylene glycol dimethylacrylate.

EXAMPLE 4

The same formulation as in Example 3 was made, except that monomers used were 90/5/5 n-butyl methacrylate/2-ethylhexylacrylate/diethylene glycol dimethacrylate. Using the above densities, the total volume fraction of solids was about 52.8%, 8% being contributed by the whiskers.

EXAMPLE 5

The following formulation was made in general accordance with the procedures of Example 1.

| AKP 20 Alumina 64.80 g | |
| --- | --- |
| yttria | 7.10 |
| SiC whiskers | 10.00 |
| monomers | 9.70 |
| DBP | 4.40 |
| Decalin | 2.50 |
| RE-610 | 1.50 |

Monomers were 90/5/5 n-butyl methacrylate/methacrylic acid/diethylene glycol dimethacrylate. Using the above densities, the total volume fraction of solids was about 50.9%, with about 7.6% due to the whiskers.

EXAMPLE 6

The following formulation was made in general accordance with the procedures of Example 1:

| AKP 20 Alumina 63.17 g | |
| --- | --- |
| yttria | 7.01 |
| SiC whiskers | 9.82 |
| monomers | 11.00 |
| DBP | 5.00 |
| Decalin | 2.50 |
| RE-610 | |

Monomers were 90/5/5 n-butyl methacrylate/methacrylic acid/diethlene glycol dimethacrylate. In addition, 10 g of 85/5/5 isobutyl methacrylate/methacrylic acid/diethylene glycol dimethacrylate/2-ethylhexylacrlate, along with 6 g of DBP were substituted in the above formulation. The total volume fraction of solids was about 46.6%, with about 7% due to the whiskers.

The viscosity of all of the above solutions, prior to the addition of the initiator, was between 3500 and 5500 cPs at $100 \, s^{-1}$.

Upon reviewing the foregoing embodiments and descriptions, certain additions, alterations, or other modifications may become apparent to the artisan, and such changes are intended to be within the scope and spirit of the present invention as defined by the claims.

What is claimed is:

1. A process for forming a dense article, comprising:
   (a) providing a mixture of components consisting essentially of sinterable particles, polymerizable monomers, high aspect ratio particles, solvent, and dispersant, the mixture having at least 45% by volume of total solids including the sinterable and high aspect ratio particles, and 5-40% by volume of high aspect ratio particles;
   (b) agitating the mixture under high energy to produce a slurry having a viscosity of not more than 10,000 cPs at $100 \, s^{-1}$;
   (c) injecting the slurry into a closed mold of a desired shape at an injection pressure of not more than 100 psi;
   (d) heating the slurry to a sufficient temperature and for a sufficient length of time to polymerize the monomers, resulting in a rigid green article; and
   (e) firing the green article to produce a densified article.

2. A process according to claim 1, wherein the sinterable particles are ceramic and composed of particles selected from the group consisting of alumina, silicon nitride, SiAlON, zirconium oxide, silicon carbide, tungsten carbide, beryllia, boron nitride, boron carbide, aluminum nitride, and mixtures thereof.

3. A process according to claim 1, wherein the monomers are selected from the group consisting of acrylic acid, derivatives thereof, esters thereof, and mixtures thereof.

4. A process according to claim 1, wherein the sinterable particles are composed of metal selected from the group consisting of iron, nickel, copper, gold, silver, alloys thereof, and mixtures thereof.

5. A process according to claim 1, wherein the total solids fraction is at least 50% by volume.

6. A process according to claim 1, wherein the high aspect ratio particles are present at 5-30% by volume.

7. A process according to claim 1, wherein the solvent is a volatile solvent.

8. A process according to claim 7, further comprising the subprocess of suppressing volatilization of the solvent until subsequent to the step of heating to polymerize.

* * * * *